Sept. 25, 1945.    M. DESCARSIN    2,385,567
ELECTRICAL HEATING OF ARTICLES MADE OF
GLASS OR OTHER VITREOUS MATERIAL
Filed Sept. 25, 1941

Inventor
M. Descarsin
By C. F. Wenderoth
Attorney

Patented Sept. 25, 1945

2,385,567

UNITED STATES PATENT OFFICE 2,385,567

ELECTRICAL HEATING OF ARTICLES MADE OF GLASS OR OTHER VITREOUS MATERIAL

Maurice Descarsin, Paris, France; vested in the Alien Property Custodian

Application September 25, 1941, Serial No. 412,345
In France May 15, 1941

4 Claims. (Cl. 219—47)

The electrical heating of articles made of glass, or other vitreous material, to a temperature sufficiently high to allow them to be shaped, and in particular, to cut them or to weld them to each other or to other articles, can be effected in various manners, in particular by electric arcs or sparks which are directed on to the glass, or by dielectric losses which take place in the field of a condenser the armatures of which are connected to a source of alternating current of very high frequency.

It is thus, for instance, that glass members such as a bulb of a thermionic valve and a base or foot forming admission for the electrodes have been welded together, by causing to pass in the glass an electric current of high voltage (10 to 20 kv.) and of high frequency (1 megacycle) by means of strong electrodes and, in certain cases, of blow-pipe flames serving as gaseous conductors for localizing the discharge in the region of the glass to be heated. This process has the double inconvenience of necessitating, on the one hand, the use of a high voltage, which entails difficulties of insulation and the risk of danger for the staff, on the other hand, a complicated apparatus owing to the fact that it is necessary to adjust the direction and the spacing apart of the sparks which raise the glass to melting temperature, and to use, in most cases, the flame of a blow-pipe.

Therefore, it has already been proposed, in particular for fixing the bulbs on the glass bases, to place these articles in the electric field of a condenser of still higher frequency, reaching 10 megacycles, but of much lower voltage of the order of 1 kv., the heating being then effected by dielectric losses and not, as in the other process, by means of a current passing in the glass. The device for carrying out this heating method was not only very simple, but the manipulations it required presented the minimum risk and danger for the staff charged therewith; moreover the energy consumed was appreciably lower than that when heating by means of electric arcs or sparks. On the contrary, the rise in temperature by dielectric losses in the mass of glass was very slow at the beginning of the heating, as said losses are so much the lower as the glass is colder and, moreover, it was difficult to exactly circumscribe the heating zone by maintaining a suitable temperature at each of its points.

The present invention remedies these inconveniences. It has for object a process which allows of obtaining a local heating of the glass which is both rapid and economical, and of accurately controlling the intensity of the heating in a given region of the glass.

The process according to the invention consists, in the first place, in preheating said region by any source of heat raising the temperature to about 200°, that is to say, consuming a small number of calories, before subjecting the glass to the action of the electric field, so as to increase, at the very beginning of said action, the dielectric losses which originate in the glass.

It moreover consists in focussing the lines of force of the field in said region by giving to the armatures of the condenser an arrangement and/or a shape suited to the size and shape of the region and, in particular when the glass articles are hollow, in arranging within said articles, and opposite the armatures, suitable focussing members. Said members present, over those already used for focussing on a given region of the glass, the flames of a blow-pipe or electric sparks, the advantage of being fixed, that is to say, of necessitating no adjustment during the operation for softening and melting the glass.

Finally, the process according to the invention consists in imparting a relative movement to the glass article and to the armatures of the condenser, as well as to the focussing members, when the shape and arrangement of said armatures do not allow the electric field to act simultaneously with the desirable intensity in all the points of one and the same region.

The preheating is preferably effected by electric resistances, either independent, or combined with the armatures or the focussing members, said armatures and members then serving at the same time as sources of heat.

The movement which is imparted, either to the glass article, or to the armatures of the condenser and to the focussing members, or to all at the same time, is preferably obtained by a movement of rotation about the axis of a cylindrical portion of the glass article when the heated region in said cylindrical portion.

The accompanying drawing illustrates, by way of nonlimiting examples, various methods for carrying out the process according to the invention.

Figure 11:
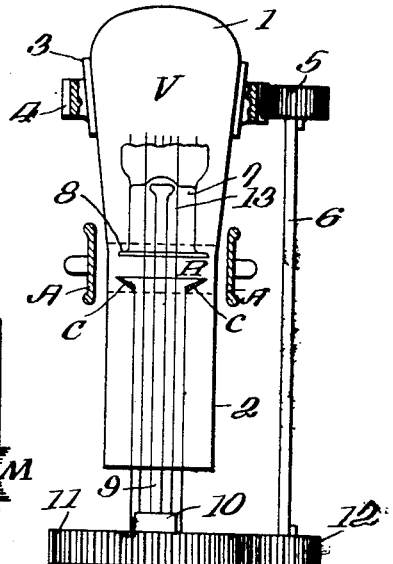

Fig. 11 diagrammatically shows an apparatus for carrying into practice the process according to the invention intended for the welding of bulbs on the bases of thermionic valves.

The same reference letters have been used in the various figures to designate the same elements:

The article made of glass or other vitreous material is designated by the letter V, the region of said article which is to be heated in order to shape it, is limited by two dotted lines and designated by R, the armatures of the condenser by A, the supplementary members for focussing the field, independent from the armatures or not, by C, the source of high frequency electric current by F, the preheating source allowing to raise the temperature of the region R, by T, and earth by M.

Figure 1:
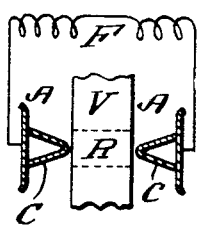
Figs. 1 to 9 are diagrammatic views in longitudinal section showing various embodiments of the invention.

The glass rod V illustrated in Fig. 1, the small annular part R of which is to be heated, in order to cut said tube in said part, for instance, is placed between the two flat armatures A connected to the source of high frequency current F; said armatures are provided with transverse projections C having a low coefficient of dielectric losses and the protuberant part C of which is at the level of the center of the portion R which is to be heated.

Figure 2:
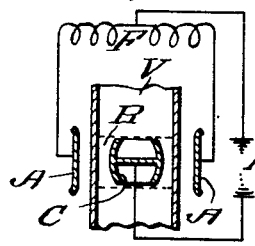
Figure 3:
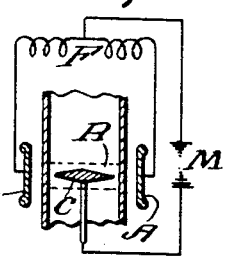

The glass tube V illustrated in Figs. 2 and 3 is also placed between two flat armatures A, but, in this case, it is preferable to arrange the focussing members C, of suitable shape, within the tube and opposite the armatures, said members being preferably made of metal and earthed.

Figure 4:
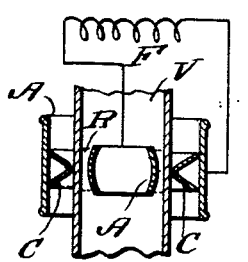

In the case of a hollow article, as shown in Fig. 4, the armatures can also be arranged concentrically, one outside, the other inside the article; the focussing of the field being obtained by projections C carried by one or the other of the two armatures, or by both armatures.

Figure 5:
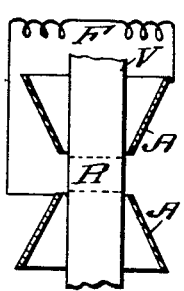

In Fig. 5 the armatures are external, and their frustum-like shape allows of focussing the field towards the small base of the truncated cone.

Figure 6:
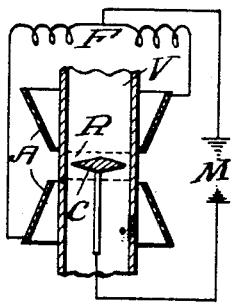

In Fig. 6 the device of Fig. 5 is completed by the addition of a focussing member arranged within the article.

Figure 7:
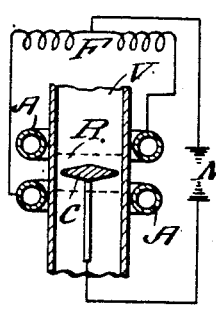

The device of Fig. 7 is a modification of that of Fig. 6, the armatures having the shape of torii.

In the devices of Fig. 1 to 7, the method for preheating the glass article is not indicated.

Figure 8:
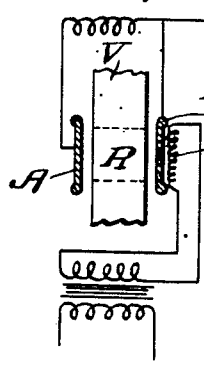
Figure 9:
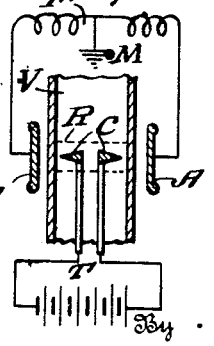

By way of examples, Fig. 8 shows a device for preheating by radiation of one of the armatures, heated in its turn by electric resistances, and Fig. 9 shows a device for preheating by radiation of a focussing member, heated in its turn by means of an independent source of heat.

Figure 10:
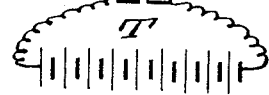
Fig. 10 shows a detail.
Figure 10:

In the case in which it is desired to use one of the armatures for preheating, it can advantageously be constituted, as shown in Fig. 10, by a suitably cut out metal plate, or by resistances of appropriate nature and suitably grouped and focussed.

Fig. 11 shows a device allowing to section in the hot state the neck of a bulb of a thermionic valve and to weld said neck, at right angles to the section effected, on the base or foot made of glass which serves for admitting the electrodes.

The glass bulb 1 comprises a neck 2 and a bulged head clamped in a support 3 which receives a movement of rotation about the axis of the bulk by means of a gear 4 and a pinion 5 keyed on a shaft 6. The foot 7, the base of which has a flared portion 8 is extended by a tube or pinch 9, which is clamped in a sleeve 10 receiving a movement of rotation, synchronous with that of the support 3 and about the same axis, owing to a gear 11 and a pinion 12 keyed on shaft 6, the gear 11 and pinion 12 having respectively the same diameters as gear 4 and pinion 5. The sleeve 10 carries a screen 13 intended to shelter the pinch from the radiation of heat given out both by the internal flange-shaped focussing member C heated, as in the device of Fig. 7, and by the region R of the neck of the glass bulb, said region being in its turn heated by any means, such as heating resistances, not shown.

The operation of the device of Fig. 11 is as follows:

During the synchronous rotation of the bulb 1 and of the base 7 in the electric field created by the armatures A, a very hot zone of small height appears at R, at the level of the flange C, and after a certain time, which is function of the nature and thickness of the glass, of the intensity and frequency of the electric field and of the temperature generated in the zone R, the glass of the neck 2 melts in said zone and the lower part of the neck becomes detached and falls by its own weight.

If, at this moment, the high frequency current feeding the armatures A is stopped, a clear sectioning of the glass is obtained with somewhat rounded edges.

If, on the contrary, the high frequency current is maintained, a rim of molten glass is formed, which rises by thickening and finally encounters the edge of the flared portion 8, in such a manner that said edge is welded to the lower rim of the bulb.

Owing to this process the flange 8 of the base 7 is heated at the same time as the neck 2 of bulb 1, first of all by the preheating, then by dielectric losses and finally by the radiation of the heat generated in the non-detached upper part of the region R of the neck 2, so that, at the moment the molten glass rim which rises and thickens comes in contact with the flared portion 8, the latter has the same temperature as said rim.

By means of this device, very strong weldings are therefore obtained with the minimum tension in the glass; furthermore, the electric heating, by eliminating any trace of humidity, prevents the deterioration of the electrodes of the thermionic valves, whereas, in the ordinary welding process by means of a gas blow-pipe, it is necessary to eliminate the steam contained in the gas by costly means necessitating constant supervision.

The device of Fig. 11 is an example of a particularly advantageous industrial application in circumstances in which there is a shortage of gas for heating; the consumption of gas is, in fact, very important, in the blow-pipe welding process.

Moreover, all the applications which utilise the process of the invention for shaping in the hot state any articles made of glass or other vitreous material, for instance, for compressing, flattening, flaring, or drawing-out certain parts thereof, are included in the scope of the invention.

I claim:

1. In a device for heating articles made of glass or other vitreous material in order to shape them in a hot state and for obtaining a local heating of the glass which is both rapid and economical and for accurately controlling the intensity of the heating in a given region of the glass, means for pre-heating the region by means of any source of heat, means for subjecting said region to the action of an electric field of very high frequency and for focusing the lines of force of said field in said region, said last-named means comprising a condenser having focusing armatures and said armatures being provided with projections made of material having small dielectric losses.

2. In a device for heating articles made of glass or other vitreous material in order to shape them in hot state and for obtaining a local heating of the glass which is both rapid and economical and for accurately controlling the intensity of the heating in a given region of the glass, means for pre-heating the region by means of any source of heat, means for subjecting said region to the action of an electric field of very high frequency and for focusing the lines of force of said field in said region, said last-named means comprising a condenser having focusing armatures in the shape of truncated cones with the small base positioned opposite the region to be heated.

3. In a device for sectioning in a hot state the neck of a bulb of glass or other vitreous material, for a thermionic valve and for welding thereto a conductor-carrying glass base having an outwardly extending flange and supported by a glass tube extending into the neck of said bulb, a means for pre-heating the region to be sectioned and welded, means for subjecting said region to the action of an electric field of very high frequency, a screen surrounding said tube and a flange-shaped member between said tube and bulb for focusing the lines of force of the electric field on said region.

4. In a device for heating hollow articles made of glass or other vitreous material in order to shape them in hot state and for obtaining a local heating of the glass which is both rapid and economical and for accurately controlling the intensity of the heating in a given region of the glass, means for pre-heating the region by means of any source of heat, means for subjecting said region to the action of an electric field of very high frequency, said last-named means comprising a condenser having focusing armatures, a resistance independent of said armatures for previously heating said armatures and focusing members opposite said armatures.

MAURICE DESCARSIN.